United States Patent
Alexander et al.

(10) Patent No.: US 6,877,057 B2
(45) Date of Patent: Apr. 5, 2005

(54) INFORMATION HANDLING SYSTEM WITH DYNAMIC INTERRUPT ALLOCATION APPARATUS AND METHODOLOGY

(75) Inventors: Marc D. Alexander, Cedar Park, TX (US); Matthew B. Mendelow, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 446 days.

(21) Appl. No.: 10/056,637

(22) Filed: Jan. 25, 2002

(65) Prior Publication Data

US 2003/0145147 A1 Jul. 31, 2003

(51) Int. Cl.[7] .............................................. G06F 13/24
(52) U.S. Cl. ...................... 710/263; 710/264; 710/118; 710/113; 710/123; 710/125
(58) Field of Search ................. 710/260–269, 710/112, 125, 118

(56) References Cited

U.S. PATENT DOCUMENTS

| | | | |
|---|---|---|---|
| 5,099,414 A | 3/1992 | Cole et al. ................... 395/200 |
| 5,615,389 A * | 3/1997 | Mayfield et al. ............... 710/8 |
| 5,640,571 A * | 6/1997 | Hedges et al. ............. 710/261 |
| 5,708,813 A * | 1/1998 | Cho et al. ................... 710/260 |
| 5,881,294 A * | 3/1999 | Downey et al. ............ 710/260 |
| 5,931,936 A | 8/1999 | Chung et al. ............... 710/263 |
| 6,006,301 A * | 12/1999 | Tetrick ........................ 710/260 |
| 6,085,277 A * | 7/2000 | Nordstrom et al. ......... 710/263 |
| 6,141,703 A * | 10/2000 | Ding et al. .................... 710/10 |
| 6,189,065 B1 * | 2/2001 | Arndt et al. ................ 710/260 |
| 6,237,058 B1 * | 5/2001 | Nakagawa .................. 710/260 |
| 6,260,100 B1 * | 7/2001 | Kessler ....................... 710/260 |
| 6,272,618 B1 | 8/2001 | Tyner et al. .................. 712/31 |
| 6,425,038 B1 * | 7/2002 | Sprecher ..................... 710/269 |
| 6,490,645 B1 * | 12/2002 | Shahaf et al. .............. 710/244 |
| 6,598,105 B1 * | 7/2003 | Oshins et al. .............. 710/264 |
| 2001/0027502 A1 * | 10/2001 | Bronson et al. ............ 710/112 |
| 2002/0029310 A1 * | 3/2002 | Klein ......................... 710/260 |
| 2002/0116563 A1 * | 8/2002 | Lever ......................... 710/260 |
| 2003/0061423 A1 * | 3/2003 | Rankin et al. .............. 710/260 |
| 2003/0065856 A1 * | 4/2003 | Kagan et al. ............... 710/263 |
| 2003/0115394 A1 * | 6/2003 | Kulchytskyy et al. ....... 710/260 |
| 2003/0145147 A1 * | 7/2003 | Alexander et al. .......... 710/260 |

OTHER PUBLICATIONS

Printed material from http://www.dell.com and its subdirectories, dated Oct. 31, 2001.
Printed material from http://www.google.com and its subdirectories, dated Oct. 31, 2001.
Printed material from http://www.pcaccelerate.com and its subdirectories, dated Oct. 31, 2001.
Printed material from http://www.general–micro–systems.com and its subdirectories, Oct. 31, 2001.
Printed material from http://peripherals.about.com and its subdirectories, dated Nov. 14, 2001.
Printed material from http://www.developer.intel.com and its subdirectories, dated Jan. 10, 2002.
Printed material from http://www.techweb.com and its subdirectories, dated Jan. 10, 2002.

* cited by examiner

*Primary Examiner*—Tim Vo
*Assistant Examiner*—Kim T. Huynh
(74) *Attorney, Agent, or Firm*—Haynes and Boone, LLP

(57) ABSTRACT

An information handling system is provided which includes a dynamic interrupt router for balancing interrupt assignments among a plurality of devices requesting interrupt assignments. The system balances interrupt assignments among both fixed devices mounted on the processor board and interrupt assignments to devices situated in expansion slots. When the system is populated with a large number of devices relative to the number of available interrupts, improved interrupt sharing is desirably achieved by causing a device which generates a large number of interrupt requests to share a common interrupt with a device which generates a lower number of interrupts.

23 Claims, 5 Drawing Sheets

INFORMATION HANDLING SYSTEM WITH DYNAMIC INTERRUPT ALLOCATION APPARATUS AND METHODOLOGY

BACKGROUND

The disclosures herein relate generally to information handling systems and more particularly to processor interrupt techniques associated with such systems.

Devices in an information handling system typically employ interrupts to notify one or more processors that a particular device in the system requires attention. Early personal computer systems employed the so-called Industry Standard Architecture (ISA) bus in which devices could not share interrupts. In contrast, the more recent Peripheral Component Interconnect (PCI) bus employs sharable interrupts. In the PCI bus architecture, two or more devices fixed to the motherboard or devices plugged into expansion slots on the motherboard may share the same interrupt.

System designers can distribute PCI interrupts based on the topology of the fixed devices soldered down on the motherboard, such as integrated video and an integrated network interface, to assure that interrupts (IRQ's) are distributed evenly across such devices. However, designers can neither control nor predict which PCI expansion slots will be populated with devices by the user or others This often results in an inefficient interrupt (IRQ) distribution among the devices plugged into expansion slots whereby some interrupts carry a larger burden than other interrupts. While in such a system, if many devices are assigned to a particular sharable interrupt, the system will still function, although significant delays will be experienced while the system polls to see from which particular device the shared interrupt originated.

What is needed is a mechanism to balance IRQ's among fixed devices on the motherboard and which accounts for the scenario where a subset of expansion slots are populated with devices installed by the user or others. Balancing of IRQ's across all of these fixed devices and later installed expansion devices is desirable to decrease device latency or response times. It is known to employ PIIX (PCI ISA IDE Accelerator) and ICH (I/O Controller Hub) routing logic to map PCI interrupts to ISA interrupts; however, unfortunately this does not address the IRQ balancing problem at hand.

SUMMARY

Accordingly, in one embodiment an information handling system is provided which includes a processor and a memory coupled to the processor. The system further includes an interrupt controller coupled to the processor and a dynamic router, coupled to the interrupt controller, for allocating interrupts to devices. The system includes a first device which requests a first interrupt and which is assigned the first interrupt by the dynamic router. The system further includes a second device which requests the first interrupt and which is instead assigned a second interrupt by the dynamic router such that interrupt requests are dynamically allocated to provide a more balanced interrupt distribution.

A principal advantage of this embodiment is the more uniform distribution of interrupts across devices on the processor circuit board and devices populating the expansion slots. Moreover, when the system runs out of interrupts which can be uniquely assigned to each interrupt requesting device, improved interrupt sharing is desirably achieved by causing a device which generates a large number of interrupt requests to share a common interrupt with a device which generates a lower number of interrupts.

DETAILED DESCRIPTION

Figure 1:
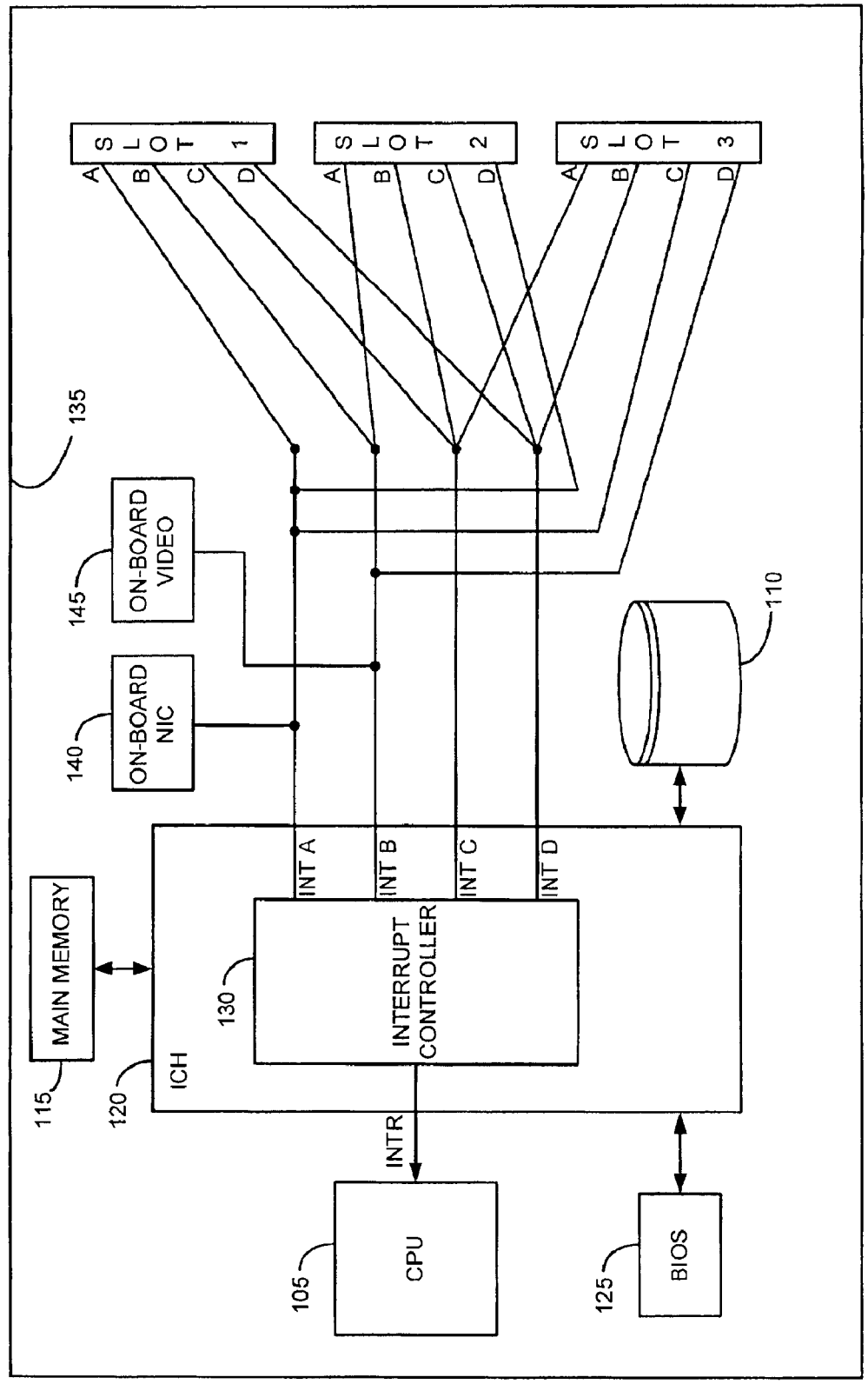
FIG. 1 is a block diagram showing an embodiment of an information handling system employing a conventional interrupt assignment arrangement.

FIG. 1 depicts a conventional information handling system 100 such as a computer system, for example. An information handling system is defined as an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes.

System 100 includes a processor 105 (CPU) for executing programs which are typically stored in a storage device 110. A main memory 115 facilitates execution of programs by processor 100 by providing temporary storage for instructions and data. Processor 105, storage device 110 and main memory 115 are coupled together by a conventional I/O controller hub (ICH) 120 as shown. A Basic Input Output System (BIOS) Flash memory 125 stores firmware which provides an interface between the operating system and hardware devices. ICH 120 includes an interrupt controller 130 having four inputs designated INT A, INT B, INT C and INT D in this particular example, each corresponding to a different interrupt. Interrupt controller 130 is coupled to processor 105 by an INTR line which carries a signal that interrupts the processor to call its attention to a particular device requiring service.

In this particular example, the components discussed are situated on a common board, often referred to as the motherboard 135. Network interface controller, NIC 140, is fixed or integrated on motherboard 135 and is coupled to the interrupt A (INT A) input of interrupt controller 130. A video controller 145 is also fixed or integrated on motherboard 135 and is coupled to the interrupt B (INT B) input of interrupt controller 130 as shown in FIG. 1. At this point, interrupts A and B are distributed evenly between on-board devices NIC 140 and video controller 145. Other on-board devices such as USB and SMBUS and audio controllers also need interrupts; however, for simplicity the case of just two on-board devices, namely NIC 140 and video controller 145 is discussed here.

In addition to the fixed devices just discussed which are situated on the motherboard, other devices may be plugged into some of or all of expansion slots 1, 2 and 3. Each of slots 1, 2 and 3 can ask for four interrupts (INT A, INT B, INT C and INT D). For this reason each of slots 1, 2 and 3 are illustrated as being coupled to the INT A, INT B, INT C and INT D inputs of interrupt controller 130. However, in actual practice, a device situated in an expansion slot typically asks for one interrupt. If slot 1 asks for INT A, it will be assigned INT A. If slot 2 asks for INT A, it might also be assigned INT A despite other unused interrupts being available.

Returning now to the example wherein interrupts INT A and INT B are already assigned to fixed devices NIC 140 and video controller 145, respectively, if the slot 1 device requests interrupt A, then INT A is assigned to the slot 1 device. Thus, NIC 140 and the slot 1 device will share INT A. If a slot 2 device should request interrupt B, then INT B is assigned to the slot 2 device. In this case, on-board video controller 145 and the slot 2 device share INT B. If slot 3 is now populated with an expansion card and that card requests interrupt C, then INT C is assigned to the slot 3 device. In this scenario, only the slot 3 device has a unique interrupt, namely INT C. The remaining slot 1 and slot 2 devices must share interrupts with the on-board devices. Stated alternatively, INT A and INT B are shared while INT C is not shared and INT D remains unused.

Figure 2:
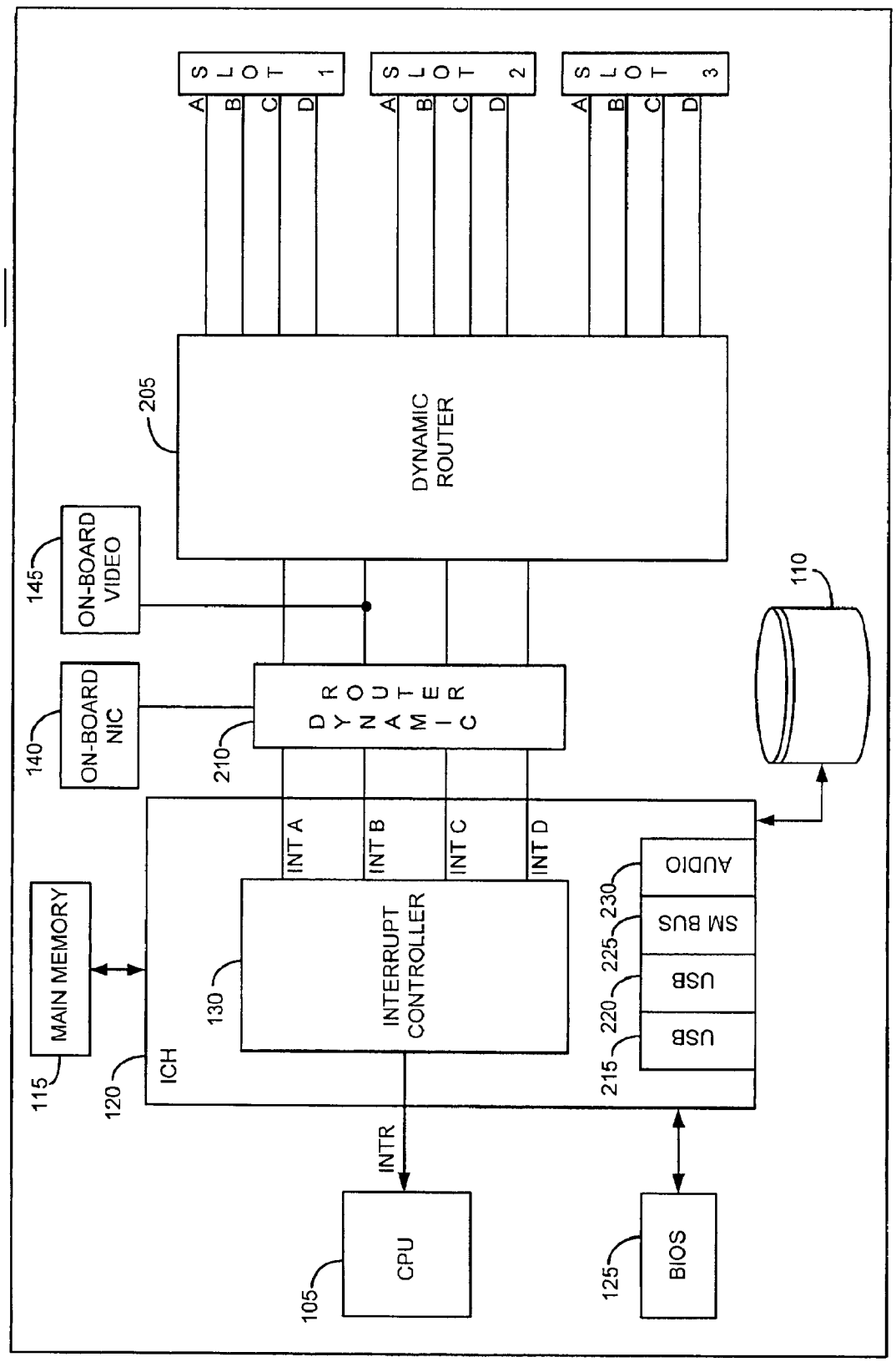
FIG. 2 is a block diagram showing the disclosed information handling system which employs improved interrupt assignment and sharing.

The disclosed information handling system 200 of FIG. 2 solves this problem by dynamically rerouting interrupt assignments as now discussed. System 200 includes a dynamic router 205 which, when presented with the scenario just discussed with respect to system 100, takes the request of the slot 1 device to be assigned interrupt A and instead dynamically assigns interrupt C, which was previously unassigned. The slot device 1 is thus provided with a unique interrupt.

In more detail, information handling system 200 of FIG. 2 includes several structures in common with system 100 of FIG. 1 with like numbers indicating like components. Dynamic router 205 is situated between interrupt controller 130 and expansion slots 1–3 to intercept interrupt assignment requests from the slots to assure that the slots are assigned free (unshared) interrupts if possible. In this manner, interrupt sharing and corresponding delays are reduced. This reassignment of interrupts is carried out during Power On Self Test (POST) in one embodiment. Another dynamic router 210 can be employed between on-board NIC 140 and the interrupt inputs INT A, INT B, INT C and INT D of interrupt controller 130 as shown. Dynamic router 210 operates to assign an unused interrupt to NIC 140 provided such an interrupt is available. Still another dynamic router (not shown) can be employed in a similar manner for on-board video controller 145 to provide an available interrupt thereto. The logic of dynamic router 210 will be discussed later in more detail. It is noted that Universal Serial Bus (USB) devices 215 and 220, a system management bus (SM BUS) 225 and an audio device 230 are typically included within the ICH chip 120 in contemporary computer architectures. Interrupts are generally pre-assigned to such internal, fixed devices and are thus not movable or re-routable. However, such pre-assigned interrupts can be still be shared with devices external to the ICH, such as devices in expansion slots 1–3 or on-board devices 140 and 145.

Figure 3:
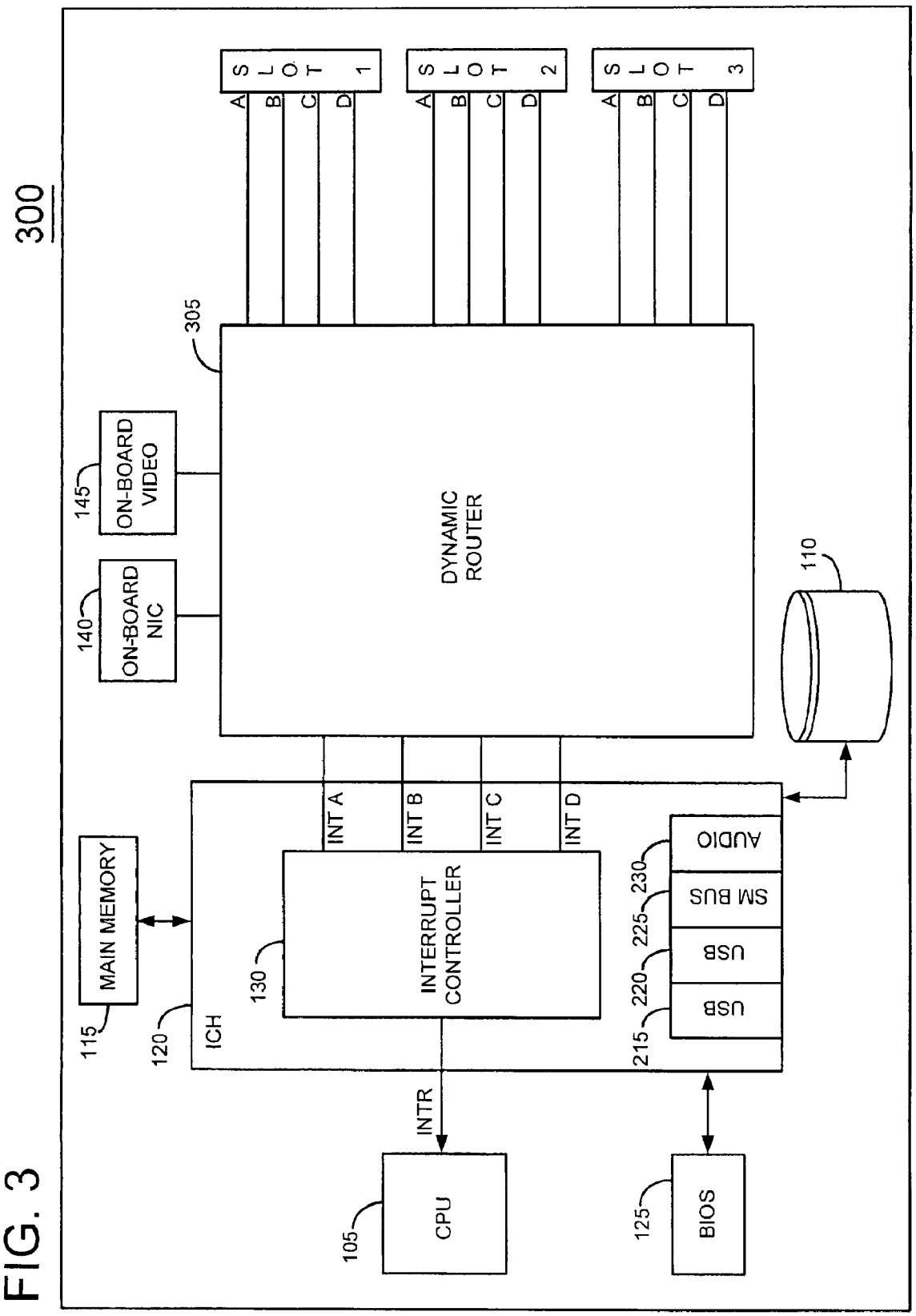
FIG. 3 is a block diagram showing another embodiment of the disclosed information handling system which employs improved interrupt assignment and sharing.

As seen in FIG. 3, an information handling system 300 includes a dynamic router 305 that can be configured to not only reroute the interrupts for expansion slots 1–3, but for the on-board devices as well, such as on-board NIC 140 and on-board video 145.

Figure 4:
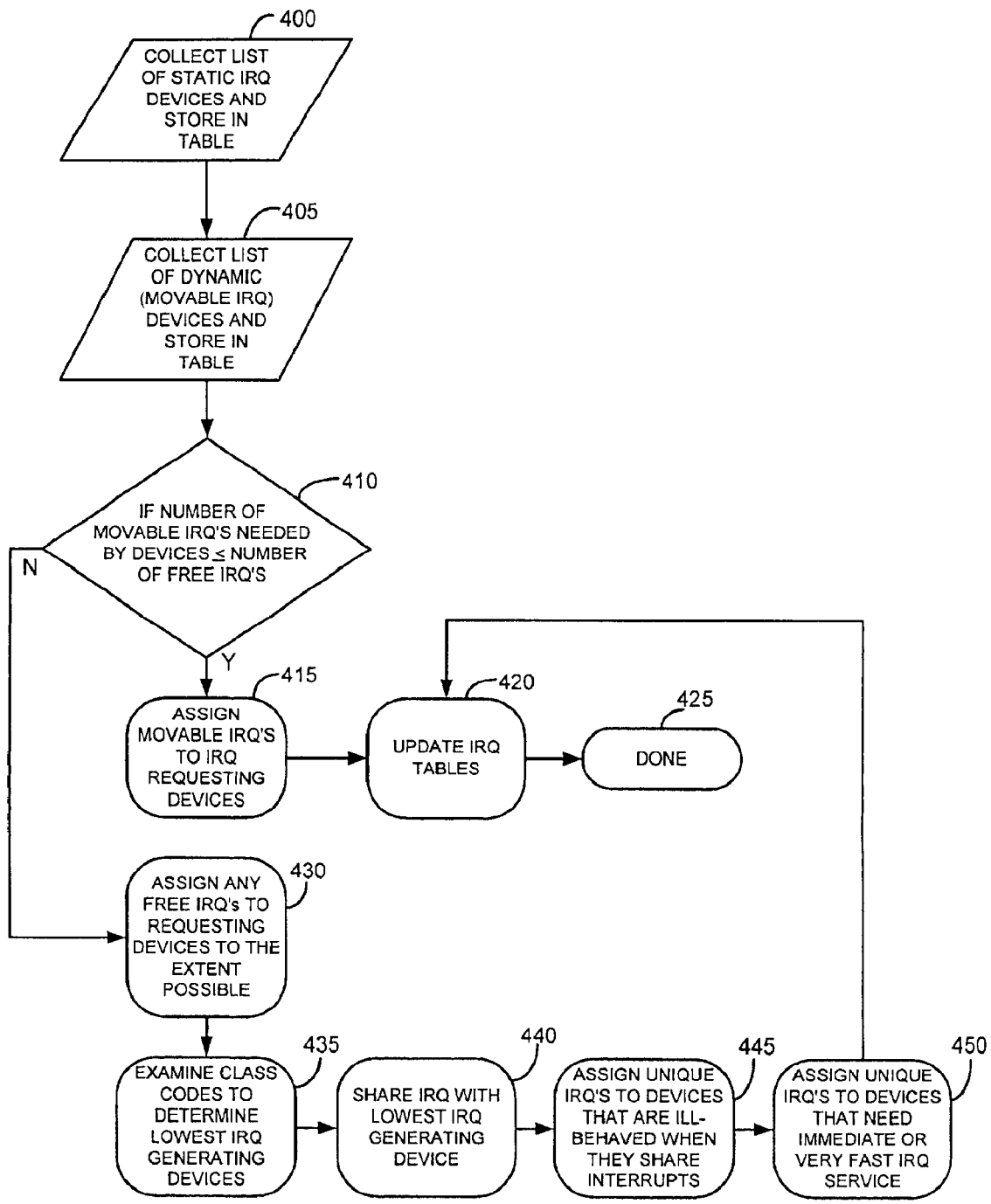
FIG. 4 is a flowchart depicting the operation of a dynamic router in the information handling system of FIG. 3.

Dynamic router 305 is conveniently implemented as a programmable gate array which is programmed to carry out the interrupt reassignment methodology described in the flow chart of FIG. 4. (Dynamic router 205 of FIG. 2 is similarly programmed as compared to dynamic router 305 of FIG. 3, but dynamic router 205 need only manipulate the interrupts associated with slots 1–3).

During or after power-on-self-test (POST), dynamic router 305 collects a list of static IRQ (interrupt request) devices and stores that list in a table as per step 400. Static IRQ devices are those devices whose interrupts are non-movable or not re-routable because they exist within the ICH chip 120. For example, USB 215, USB 220, SM Bus 225 and audio 230 are static IRQ devices which would be collected into this list of static or non-movable IRQ devices. In actual practice, this information is stored in an interrupt table (not shown) which includes a list of static devices and the corresponding non-movable interrupt associated with each static device.

Then, as per step 405, a list of dynamic or movable IRQ devices is collected and stored in an interrupt table. That list includes all devices that are plugged into expansion slots 1–3 or which are fixed on the motherboard, but coupled to dynamic router 305, such as NIC 140 and video controller 145. Each of these movable IRQ devices needs to have an interrupt assigned to it, whether it be a unique interrupt or ultimately a shared interrupt. A list of unassigned movable interrupts is also maintained and stored in a table. These unassigned movable interrupts are also referred to as free interrupts or free IRQ's.

A determination is then made at decision block 410 to see if the number of available movable IRQ's needed by devices is less than (or equal to) the number of free IRQ's available. If the number of movable IRQ's needed by devices is less than or equal to the number of available (free) IRQ's, then the movable IRQ's are assigned to the IRQ requesting devices as per block 415. In actual practice, the interrupt table that stores the unassigned movable interrupts is updated to reflect that a particular interrupt has been assigned and to which device it is assigned.

By way of example, if there are three available movable interrupts in the interrupt table and there are only 2 devices which need interrupts to be assigned, then two of the three available movable interrupts are assigned to the 2 devices, respectively. The interrupt table is updated accordingly.

By way of another example, if the device in slot 1 is using IRQ A and the device in slot 2 also requests assignment of IRQ A, the dynamic router 305 instead reassigns or allocates the available IRQ B to the device in slot 2.

An internal IRQ routing table stored in memory is updated as per step 420. This IRQ table keeps track of which devices are connected to which IRQ's. More specifically, the internal IRQ routing table is a scratchpad table which gets marked as IRQ's are allocated to different devices. Each device and its assigned IRQ are recorded in this IRQ table. In this manner, the system knows which IRQ's are still available when the next device is considered for IRQ assignment.

This internal IRQ routing table is to be distinguished from three external tables that are presented to various operating systems as described subsequently. These external tables are a formal presentation of the final IRQ—device mapping to the operating system. In actual practice, 3 external routing tables are updated. More specifically, a Windows 98 IRQ routing table is updated for Windows 98 based systems; the MP table is updated to satisfy Windows NT 4 based systems and the ACPI tables are updated to satisfy Windows XP and Windows 2000 based systems, (Windows is a registered trademark of Microsoft Corporation). All three of these tables are updated because it is not known which particular operating system the user will employ. Once step 420 is carried out, the interrupt allocation process is complete as indicated in block 425 and the operating system can now load.

In the scenario described above, decision block 410 determined that there is a sufficient number of free IRQ's for the number of devices installed without the need for interrupt sharing. However, there are instances when the number of available movable interrupts needed by devices is not less than the number of available free IRQ's. Stated alternatively, decision block 410 may determine that the number of devices needing movable IRQ's assigned is greater than the number of available movable IRQ's. In that instance, process flow continues from decision block 410 to block 430 at which dynamic router 305 assigns any available movable (i.e. free) IRQ's to any devices requesting IRQ's to the extent possible. The interrupt table is updated accordingly to reflect this assignment or re-assignment. Any devices thereafter remaining without an interrupt assigned will need to share an interrupt with another device as described subsequently.

A decision is made regarding with which other device a remaining unassigned device will share an interrupt. To accomplish this, dynamic router 305 examines the class codes of the IRQ generating devices to determine which IRQ generating device generates the least number of interrupts over time, as indicated in block 435 of the flow chart of FIG. 4. The remaining device without an interrupt assigned is then assigned the same interrupt as the lowest IRQ generating device as per block 440. That remaining device thus shares the interrupt with the lowest IRQ generating device. Alternatively, the remaining device could be assigned the same interrupt as a device which generates a relatively low number of interrupts, if not the absolute lowest. If still another device remains without an assigned interrupt, that device would be assigned to share the same interrupt as the second lowest interrupt generating device, or another relatively low interrupt generating device. Some devices are known to not share interrupts in a well-behaved fashion. Such ill-behaved devices are flagged in the interrupt table and assigned their own unique interrupt whenever possible as per step 445. As per step 450, IRO's are also assigned to devices which, although they may generate a relatively low number of IRQ's, they are a type of device which needs its interrupts serviced immediately or very fast. Such a device may require a uniquely assigned IRQ. Process flow then continues to block 420 at which the interrupt table is updated to reflect the IRQ assignments just made. Interrupt allocation is now complete and the operating system can load as per block 425.

By way of example, returning to decision block 410, assume that two movable interrupts are free and available, but three devices are in need of an interrupt assignment. In this case, two of the three available movable interrupts are assigned to the first two devices. The remaining device will share an interrupt with another device as described above.

Figure 5:
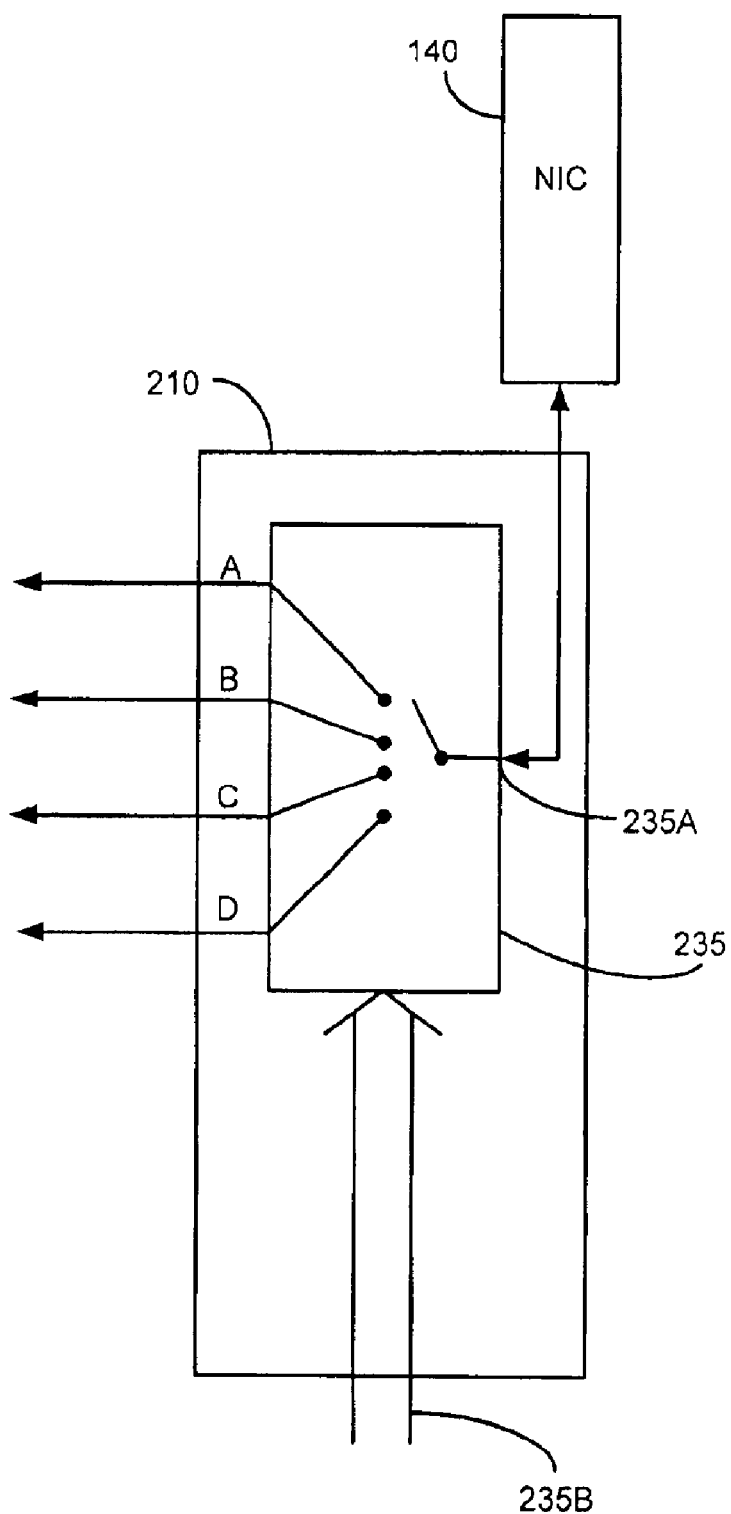
FIG. 5 is a block diagram showing an embodiment of multiplexer logic for selectively connecting or assigning devices such as a network interface card (NIC) to different interrupt lines.

FIG. 5 is a high level diagram of circuitry that can be used to implement a dynamic router such as dynamic router 210 of FIG. 2. It will be recalled that dynamic router 210 couples NIC 140 to a selected one of interrupt lines A, B, C and D of interrupt controller 130 of FIG. 2. As seen in FIG. 5, dynamic router 210 includes a multiplexer 235 having an input 235A to which NIC 140 is coupled. Input 235A is the input of a one input, four output multiplexer 235. The four outputs of multiplexer 235, i.e. A, B, C and D are respectively coupled to the 4 inputs of interrupt controller 130, namely INT A, INT B, INT C and INT D. A steering signal is applied to steering input 235B to instruct multiplexer 235 as to which output of multiplexer 235 should be selected. In this manner, NIC 140 can be connected to and assigned to any one of interrupts A, B, C and D.

While the representative examples herein have described a system employing 4 interrupts, the concepts and implementation disclosed also apply to systems with other numbers of interrupts such as 8 interrupts and 16 interrupts for example.

As can be seen, a principal advantage of these embodiments is the provision of the ability to dynamically reassign interrupts to avoid interrupt sharing in many instances. In other instances, interrupt sharing is optimized by a device generating a high number of interrupts sharing a common interrupt with a device generating a low number of interrupts.

While this novel apparatus and methodology has been described with reference to a computer system type of information handling system, the disclosed technology also applies to other systems employing interrupts such as personal digital assistants (PDA's), cellular and other telephone devices, switchers, routers, satellite receivers, home entertainment systems, electronic gaming equipment, automotive electronic devices, etc., and combinations thereof.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
   a processor;
   a memory coupled to the processor;
   an interrupt controller coupled to the processor;
   a dynamic router implemented as a programmable gate array, coupled to the interrupt controller, for allocating interrupts to a plurality of devices for providing unshared interrupts to the devices;
   a first device which requests a first interrupt and which is assigned the first interrupt by the dynamic router; and
   a second device which requests the first interrupt and which is instead assigned a second interrupt by the dynamic router such that interrupt requests are dynamically allocated to provide a more balanced interrupt distribution, whereby interrupt sharing and corresponding delays are reduced.

2. The information handling system of claim 1 further comprising an interrupt table for storing information relative to which interrupt is associated with which device.

3. The information handling system of claim 2 further comprising an operating system and a data path between the operating system and the interrupt table such that the operating system is informed of the dynamically allocated interrupts by the interrupt table.

4. The information handling system of claim 1 further comprising a third device which generates a higher number of interrupt requests than the first device, the first and third devices sharing the first interrupt.

5. The information handling system of claim 1 further comprising a third device which generates a higher number of interrupt requests than the second device, the second and third devices sharing the second interrupt.

6. The information handling system of claim 1 further comprising a third device which generates a lower number of interrupt requests than the first device, the first and third devices sharing the first interrupt.

7. The information handling system of claim 1 further comprising a third device which generates a lower number of interrupt requests than the second device, the second and third devices sharing the second interrupt.

8. An information handling system handling comprising:
a processor situated on a circuitry board;
a plurality of expansion slots mounted on the circuitry board for receiving devices;
a memory, coupled to the processor, to facilitate execution of programs by the processor;
an interrupt controller coupled to the processor;
a dynamic router implemented as a programmable gate array, coupled to the interrupt controller, for allocating interrupts to a plurality of devices for providing unshared interrupts to the devices;
a first device, situated in one of the expansion slots, which requests a first interrupt and which is assigned the first interrupt by the dynamic router; and
a second device, situated in another of the expansion slots, which requests the first interrupt and which is instead assigned a second interrupt by the dynamic router such that interrupt requests are dynamically allocated to provide a more balanced interrupt distribution, whereby interrupt sharing and corresponding delays are reduced.

9. The information handling system of claim 8 further comprising an interrupt table for storing information relative to which interrupt is associated with which device.

10. The information handling system of claim 9 further comprising an operating system and a data path between the operating system and the interrupt table such that the operating system is informed of the dynamically allocated interrupts by the interrupt table.

11. The information handling system of claim 8 further comprising a third device which generates a higher number of interrupt requests than the first device, the first and third devices sharing the first interrupt.

12. The information handling system of claim 8 further comprising a third device which generates a higher number of interrupt requests than the second device, the second and third devices sharing the second interrupt.

13. The information handling system of claim 8 further comprising a third device which generates a lower number of interrupt requests than the first device, the first and third devices sharing the first interrupt.

14. The information handling system of claim 8 further comprising a third device which generates a lower number of interrupt requests than the second device, the second and third devices sharing the second interrupt.

15. A method of allocating interrupts in an information handling system comprising:
providing an interrupt controller;
implementing a dynamic router as a programmable gate array, coupled to the interrupt controller, for allocating interrupts to a plurality of devices for providing unshared interrupts to the devices;
assigning a first interrupt to a first device when the first device requests to be assigned the first interrupt; and
assigning a second interrupt to a second device when the second device requests to be assigned the first interrupt, whereby interrupt sharing and corresponding delays are reduced.

16. The method of claim 15 further comprising informing an operating system in the information handling system that the second interrupt is assigned to the second device.

17. The method of claim 15 further comprising determining if the first device generates a large number of interrupt requests and if so sharing the first interrupt with a third device which generates a lower number of interrupt requests than the first device.

18. The method of claim 15 further comprising determining if the second device generates a large number of interrupt requests and if so sharing the second interrupt with a third device which generates a lower number of interrupt requests than the first device.

19. The method of claim 15 further comprising determining if the first device generates a low number of interrupt requests and if so sharing the first interrupt with a third device which generates a high number of interrupt requests.

20. The method of claim 15 further comprising determining if the second device generates a low number of interrupt requests and if so sharing the second interrupt with a third device which generates a high number of interrupt requests.

21. The method of claim 15 wherein the first and second devices populate respective first and second expansion slots in the system.

22. The method of claim 15 wherein the first and second devices are on-board devices.

23. The method of claim 15 wherein one of the first and second devices populates an expansion slot in the system and the other of the first and second devices is an on-board device.

* * * * *